United States Patent
Yang et al.

(10) Patent No.: US 12,507,252 B2
(45) Date of Patent: Dec. 23, 2025

(54) PDCCH BASED USER EQUIPMENT (UE) CHANNEL OCCUPANCY TIME (COT) TRIGGER IN FRAME BASED EQUIPMENT (FBE) MODE

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 271 days.

(21) Appl. No.: 18/010,449

(22) PCT Filed: Sep. 3, 2020

(86) PCT No.: PCT/CN2020/113180
§ 371 (c)(1),
(2) Date: Dec. 14, 2022

(87) PCT Pub. No.: WO2022/047687
PCT Pub. Date: Mar. 10, 2022

(65) Prior Publication Data
US 2023/0224925 A1    Jul. 13, 2023

(51) Int. Cl.
*H04W 72/232*    (2023.01)
*H04W 72/1268*    (2023.01)
*H04W 74/0808*    (2024.01)

(52) U.S. Cl.
CPC ..... *H04W 72/232* (2023.01); *H04W 72/1268* (2013.01); *H04W 74/0808* (2013.01)

(58) Field of Classification Search
CPC ........... H04W 72/232; H04W 72/1268; H04W 74/0808
See application file for complete search history.

(56) References Cited

U.S. PATENT DOCUMENTS

2019/0261398 A1*   8/2019  Golitschek ........ H04W 72/0446
2019/0342915 A1   11/2019  Kim et al.
(Continued)

FOREIGN PATENT DOCUMENTS

| WO | 2016071741 A1 | 5/2016 |
| WO | 2020027533 A1 | 2/2020 |

(Continued)

OTHER PUBLICATIONS

International Search Report and Written Opinion—PCT/CN2020/113180—ISA/CN—May 26, 2021.
(Continued)

*Primary Examiner* — Won Tae C Kim
(74) *Attorney, Agent, or Firm* — Harrity & Harrity, LLP

(57) ABSTRACT

Wireless communications systems and methods related frame-based equipment (FBE) communications in a wireless communication network are provided. A method of operating a base station (BS) includes transmitting a channel occupancy time (COT) indicator in a first fixed frame period (FFP) to a user equipment (UE) in frame based equipment (FBE) mode; transmitting downlink control information (DCI) during a window of the first FFP; and receiving uplink (UL) data from the UE during a second FFP following the first FFP according to the DCI. A method of operating a UE includes receiving a COT indicator in a first FFP from a base station BS in FBE mode; monitoring a window of the first FFP; receiving a DCI during the window; and transmitting UL data to the BS during a second FFP following the first FFP according to the DCI.

28 Claims, 10 Drawing Sheets

(56) References Cited

U.S. PATENT DOCUMENTS

| | | | | |
|---|---|---|---|---|
| 2020/0367255 | A1* | 11/2020 | Takeda | H04W 72/53 |
| 2022/0345922 | A1* | 10/2022 | Guo | H04W 52/0216 |
| 2023/0284265 | A1* | 9/2023 | Rosa | H04W 74/0808 |
| | | | | 370/336 |

FOREIGN PATENT DOCUMENTS

| | | | |
|---|---|---|---|
| WO | 2020156180 | A1 | 8/2020 |
| WO | 2020165200 | A1 | 8/2020 |

OTHER PUBLICATIONS

Qualcomm Incorporated "R1-2006801 uplink enhancements for URLLC in unlicensed controlled environments" 3GPP TSG-RAN WG1 Meeting #102-e, Aug. 8, 2020 (Aug. 8, 2020), section 2, Figure 2-3-1.

LG Electronics "R1-2006316 Discussion on unlicensed band URLLC/IIOT" 3GPP TSG-RAN WG1 Meeting #102-e, Aug. 7, 2020 (Aug. 7, 2020), section 2.

Qualcomm Incorporated: "Uplink Enhancements for URLLC in Unlicensed Controlled Environments", 3GPP TSG-RAN WG1 Meeting #102-e, R1-2006801, e-Meeting, Aug. 17, 2020-Aug. 28, 2020, 7 Pages, Aug. 8, 2020.

Spreadtrum Communications: "Discussion on DL Signals and Channels for NR-U", 3GPP TSG RAN WG1 #98b, R1-1910026, Chongqing, China, Oct. 14, 2019-Oct. 20, 2019, 6 Pages, Oct. 1, 2019.

Spreadtrum Communications: "Discussion on DL Signals and Channels for NR-U", 3GPP TSG RAN WG1 #99, R1-1912561, Reno, USA, Nov. 18, 2019-Nov. 22, 2019, 5 Pages, Nov. 8, 2019.

Supplementary European Search Report—EP20951934—Search Authority—The Hague—Apr. 17, 2024.

VIVO: "Discussion on the Channel Access Procedures", 3GPP TSG RAN WG1#98bis, R1-1910204, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019, 10 Pages, XP051808107, Section 2.1, 2.5, 2.6, figures 7,8.

* cited by examiner

PDCCH BASED USER EQUIPMENT (UE) CHANNEL OCCUPANCY TIME (COT) TRIGGER IN FRAME BASED EQUIPMENT (FBE) MODE

RELATED APPLICATIONS

The present application is a 35 U.S.C. 371 National Phase entry of and claims priority to International Patent Application No. PCT/CN2020/113180, filed in China on Sep. 3, 2020, which is hereby incorporated by reference in its entirety.

TECHNICAL FIELD

This application relates to wireless communication systems, and more particularly to PDCCH based User Equipment (UE) frame based equipment (FBE) communications in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an UL transmission in an unlicensed frequency band. The UE may perform an LBT procedure prior to the scheduled time. When the LBT is a success, the UE may proceed to transmit UL data according to the schedule. When the LBT fails, the UE may refrain from transmitting.

There are two types of LBT procedures, a frame-based equipment (FBE)-based LBT and a load based equipment (LBE)-based LBT. In FBE-based LBT, channel sensing is performed at predetermined time instants. For instance, if the channel is busy, a transmitting node may back off for a predetermined time period and sense the channel again after this period. In LBE-based LBT, channel sensing is performed at any time instant and random back-off is used if the channel is found busy.

However, in FBE mode, inefficiencies can result from UE processing delay times. Consequently, there is a need to provide methods to efficiently use resources in FBE mode of operation.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with some embodiments, a method of operating a base station (BS) is presented. The method, for example, includes transmitting a channel occupancy time (COT) indicator in a first fixed frame period (FFP) to a user equipment (UE) in frame based equipment (FBE) mode; transmitting downlink control information (DCI) during a window of the first FFP; and receiving uplink (UL) data from the UE during a second FFP following the first FFP according to the DCI.

A method of operating a UE is also presented. The method, for example, includes receiving a COT indicator in a first FFP from a base station BS in FBE mode; monitoring a window of the first FFP; receiving a DCI during the window; and transmitting UL data to the BS during a second FFP following the first FFP according to the DCI.

A BS according to some embodiments includes a transceiver and a FBE communications module coupled to the transceiver. In some embodiments, the FBE communications module configured to execute instructions to transmit a COT indicator in a first FFP to a UE in FBE mode, transmit a DCI during a window of the first FFP, and receive UL data from the UE during a second FFP following the first FFP according to the DCI.

A UE according to some embodiments includes a transceiver and a FBE communications module coupled to the transceiver. In some embodiments, the FBE communications module configured to execute instructions to receive a channel occupancy time (COT) indicator in a first fixed frame period (FFP) from a base station (BS) in FBE mode, monitor a window of the first FFP, receive downlink control information (DCI) during the window, and transmit uplink (UL) data to the BS during a second FFP following the first FFP according to the DCI.

A non-transitory computer-readable medium according to some embodiments is also disclosed. The non-transitory computer-readable medium includes program code recorded thereon for operation on a BS, the program code including code for transmitting a COT indicator in a first FFP to a UE in FBE mode, code for transmitting a DCI during a window of the first FFP, and code for receiving UL data from the UE during a second FFP following the first FFP according to the DCI.

A non-transitory computer-readable medium having program code recorded thereon for operation on a UE is also presented. The program code includes code for receiving a COT indicator in a first FFP from a BS in FBE mode, code for monitoring a window of the first FFP, code for receiving a DCI during the window, and code for transmitting UL data to the BS during a second FFP following the first FFP according to the DCI.

A BS according to some embodiments can include means for transmitting a COT indicator in a first FFP to a UE in FBE mode, means for transmitting a DCI during a window of the first FFP, and means for receiving UL data from the UE during a second FFP following the first FFP according to the DCI.

A UE according to some embodiments includes means for receiving a COT indicator in a first FFP from a BS in FBE mode, means for monitoring a window of the first FFP, means for receiving a DCI during the window; and means for transmitting UL data to the BS during a second FFP following the first FFP according to the DCI.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
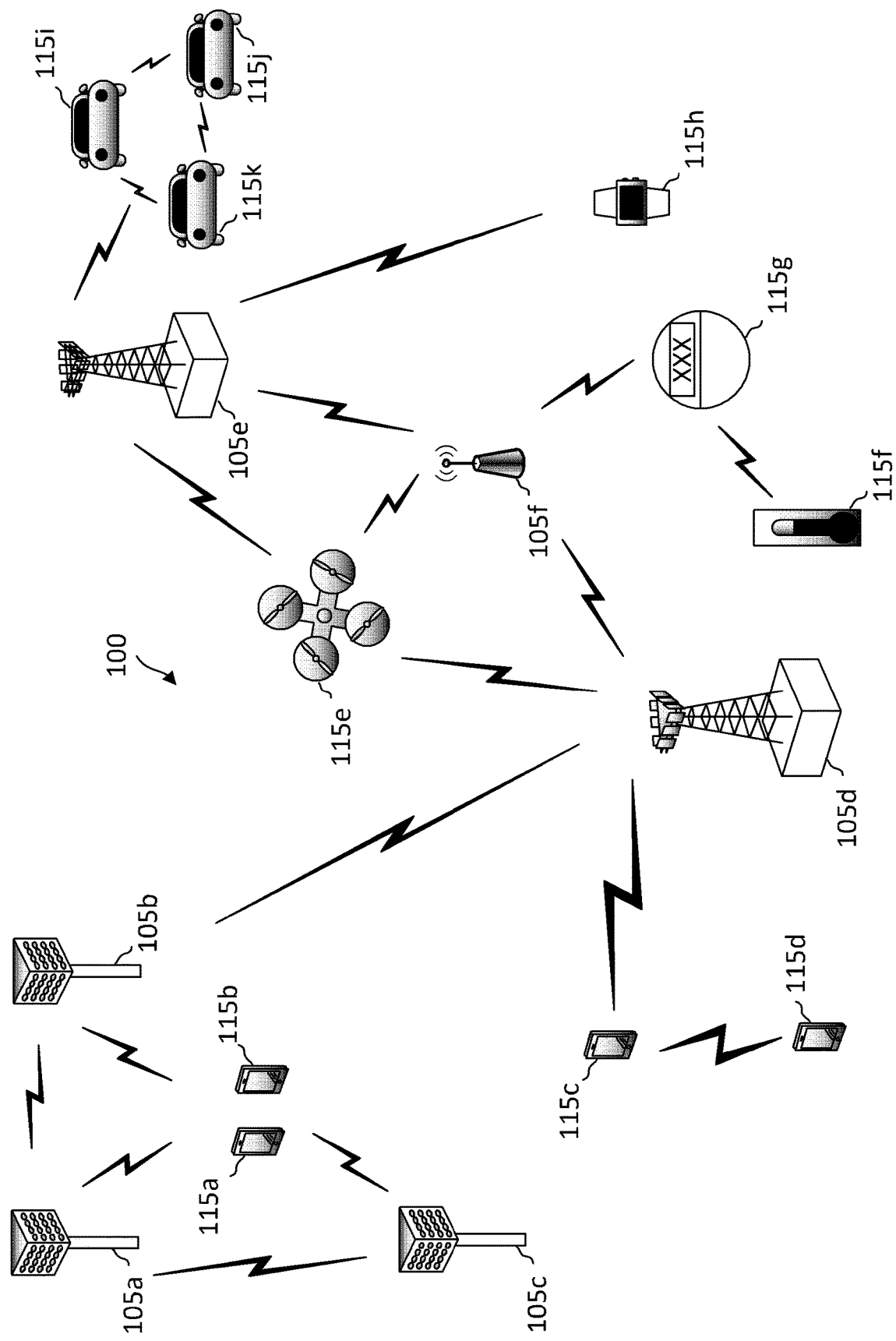
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for signaling FBE structure for communications over a shared radio frequency band and for triggering UE transmission of UL data at the beginning of a subsequent FFP of the FBE structure. For example, a BS may transmit a system information signal, such as a physical broadcast channel (PBCH) signal or a remaining system information (RMSI) signal, to indicate an FBE configuration for communicating over the shared radio frequency band. The FBE configuration may indicate a plurality of frame periods shared by a plurality of wireless communication devices. Each frame period includes a gap period at the beginning of the frame period. The frame periods may be referred to as fixed frame periods (FFPs). The gap period may be used for contention. For instance, the BS may perform an LBT during the contention period. Upon a successful LBT, the BS may use the non-gap portion of the frame period may be for UL and/or DL communications with a user equipment (UE).

In embodiments of the present disclosure, the BS may, upon a successful LBT, provide a channel-occupancy time (COT) indicator indicated that the BS has the FFP. The BS may then transmit a download control information (DCI) in a PDCCH with a trigger to the UE indicating available for UL transmission at the beginning of a subsequent FFP of the FBE structure. Upon receipt by the UE of a DCI indicating available, then the UE can transmit UL data at the beginning of the subsequent or multiple subsequent FFPs.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. ABS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything(V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PDSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. In some aspects, the network 100 may utilize an FBE-based contention scheme for sharing a radio channel among multiple BSs 105 and/or UEs 115 of different network operating entities and/or different radio access technologies (RATs).

Figure 2:
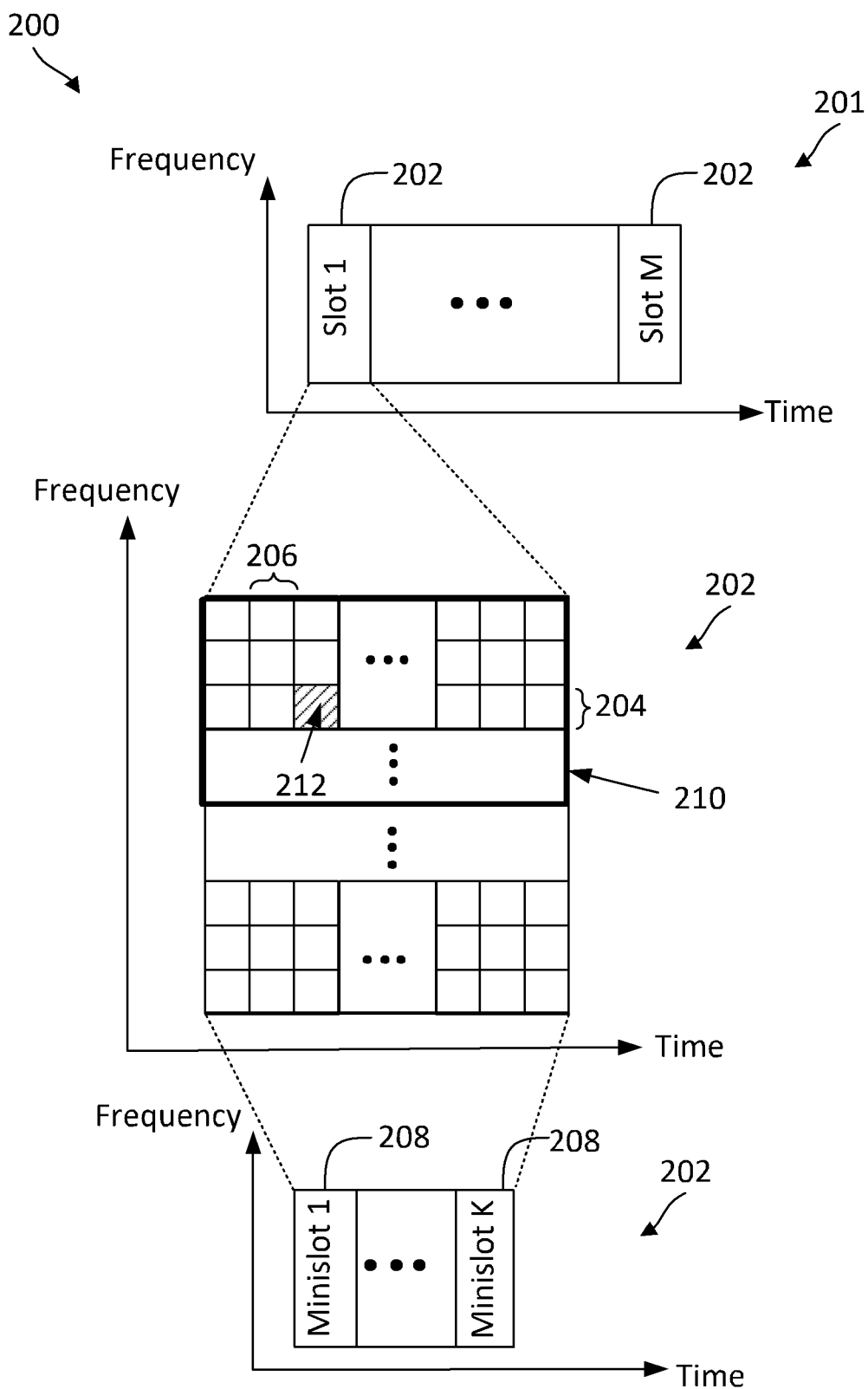
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3A:
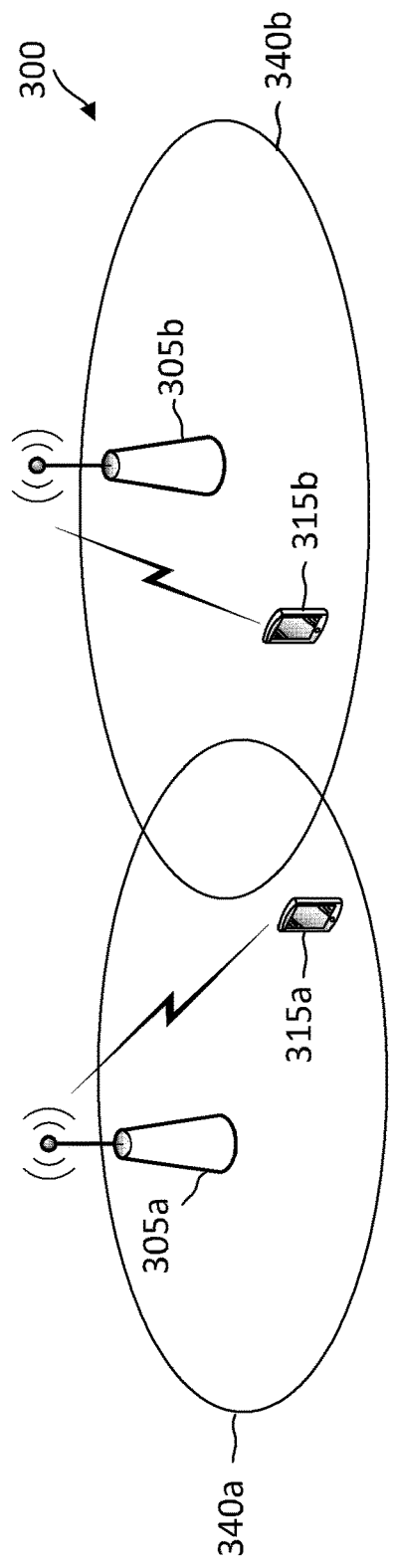
FIG. 3A illustrates an example of a wireless communications network that supports medium sharing across multiple network operating entities according to some aspects of the present disclosure.
Figure 3B:
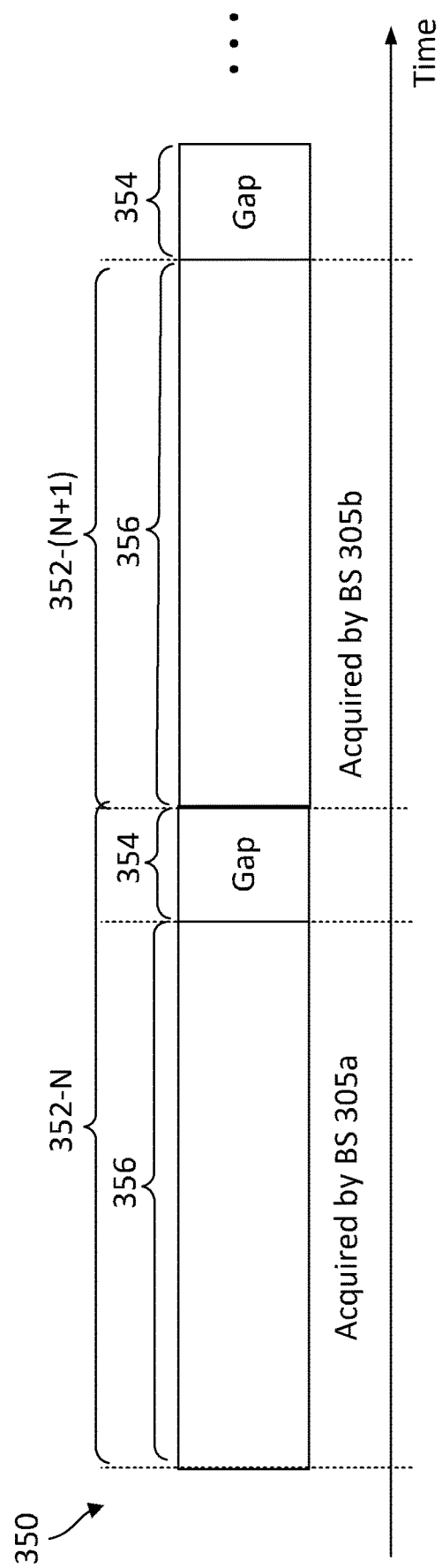
FIG. 3B illustrates a frame- based equipment (FBE) communication scheme according to some aspects of the present disclosure.

FIGS. 3A and 3B collectively illustrate FBE-based communications over a radio frequency channel (e.g., in a shared radio frequency band or an unlicensed band) for communication. FIG. 3A illustrates an example of a wireless communications network 300 that supports medium sharing across multiple network operating entities according to some aspects of the present disclosure. The network 300 may correspond to a portion of the network 100. FIG. 3A illustrates two BSs 305 (shown as BS 305a and BS 305b) and two UEs 315 (shown as UE 315a and UE 315b) for purposes of simplicity of discussion, though it will be recognized that aspects of the present disclosure may scale to many more UEs 315 and/or BSs 305. The BSs 305 and the UEs 315 may be similar to the BSs 105 and the UEs 115, respectively. FIG. 3B illustrates an FBE communication scheme 350 according to some aspects of the present disclosure. The BS 305 and the UE 315 may communicate with each other as shown in the scheme 350. In FIG. 3B, the x-axis represents time in some arbitrary units, and the y-axis represents frequency in some arbitrary units.

Referring to FIG. 3A, in the network 300, the BS 305a serves the UE 315a in a serving cell or a coverage area 340a, while the BS 305b serves the UE 315b in a serving cell or a coverage area 340b. The BS 305a and the BS 305b may communicate with the UE 315a and the UE 315b in the same frequency channel, respectively. In some instances, the BS 305a and the BS 305b may be operated by different network operating entities. In some other instances, the BS 305a and the BS 305b may be operated by different network operating entities. In some instances, the BS 305a and the BS 305b may utilize the same RAT (e.g., NR-based technology or WiFi-based technology) for communications with the UE 315a and the UE 315b, respectively. In some other instances, the BS 305a and the BS 305b use different RATs for communications with the UE 315a and the UE 315b, respectively. For example, the BS 305a and the UE 315a may utilize an NR-based technology for communication, while the BS 305b and the UE 315b may utilize WiFi-based technology communication. In general, the BS 305a and the BS 305b may be operated by the same network operating entities or different network operating entities and may utilize the same RAT or different RATs for communications in the network 300. The BS 305a, the BS 305b, the UE 315a, and the UE 315b may share access to the channel using an FBE-based contention mode as shown in the FBE communication scheme 350.

Referring to FIG. 3B, FBE communications scheme 350 includes a series of frame periods 352, of which sequential frame periods 352-N and 352-(N+1) are illustrated. Each frame period 352 includes a contention or gap period 354 and a transmission period or channel occupancy time (COT) 356. COT 356 may have a resource structure as shown in the radio frame structure 200. In some instances, each COT 356 may include one or more slots similar to the slots 202. In some instances, each COT 356 may include one or more symbols similar to the symbols 206. The starting time and the duration of the COT 356 and the gap periods 354 are predetermined. Additionally, each COT 352 may have the same duration. Similarly, each gap period 354 may have the same duration. Thus, the frame periods 352 may also be referred to as fixed frame periods (FFPs).

As illustrated in FIG. 3B, the scheme 350 partitions the frequency band 302 into a plurality of fixed frame periods (FFPs) 352 in FBE mode. As shown in FIG. 3B, an FFP 352, used by a base station (e.g., gNB) 305, may have a channel occupancy time (COT) portion 356 for transmitting downlink or receiving uplink communications. The gNB 305 may share the COT portion 356 with a UE 315 for receiving uplink communications. During the idle period or gap period 354 at an end of the FFP 352, after the COT 356, can be used for performing an LBT procedure for the next FFP 352. In the example illustrated in FIG. 3B, gap 354 of FFP 352-N can be used for performing an LBT for contention of FFP 352-(N+1).

The FFP 352 may be 1 millisecond (ms), 2 ms, 2.5 ms, 4 ms, 5 ms, 10 ms, and/or the like (including the idle period). Starting positions of the FFPs 352 within every two radio frames (e.g., even radio frames) may be given by i*P where i={0, 1, ..., 20/P−1} and P is the FFP 352 in ms. The idle period for a given subcarrier spacing (SCS) may be a ceiling value for a minimum idle period allowed by regulations divided by Ts, where the minimum idle period allowed=max (5% of FFP, 100 microseconds (μs)) and Ts is the symbol duration for the given SCS. The idle period may have no less than 5% of the FFP 352.

An FFP configuration 350 for FBE may be included in a system information block (e.g., SIB-1) or signaled in UE-specific radio resource control (RRC) signaling. If the network indicates FBE operation for fallback downlink and uplink grants, for an indication of LBT type of Cat-2 or Cat-4 LBT, the UE may follow the mechanism whereby one 9 μs slot (e.g., one shot LBT) is measured within a 9 μs interval. It should be noted that a Cat-2 LBT for FBE mode is different from a Cat-2 LBT in LBE, which has duration of 25 or 16 μs. In FBE mode, one 9 μs measurement right before the transmission is needed with at least 4 μs used for measurement.

UE transmissions within the FFP may occur if downlink signals or channels, such as a physical downlink control channel (PDCCH), a synchronization signal block (SSB), a physical broadcast channel (PBCH), remaining minimum system information (RMSI), a group common PDCCH (GC-PDCCH), and/or the like, within the FFP are detected. A same 2-bit field in load based equipment (LBE) mode may be used or reinterpreted to indicate an FBE LBT type, a cyclic prefix extension, and/or a channel access priority class indication.

In Release 16 NR unlicensed (NR-U), for example, a base station (e.g., gNB) 305 can act as an initiating device, and the UE 315 may act as a responding device. The channel access rules may thus be as follows. If the gNB 315 initiates COT 356, Cat-1 LBT may not apply and the gNB 356 may perform Cat-2 LBT right before an FFP 352. If the gNB 305 is to transmit a downlink burst in gNB COT 356, the gNB 305 may perform Cat-1 LBT if a gap from a previous downlink or uplink burst is within 16 μs, and perform Cat-2 LBT if the gap is more than 16 μs. If the UE initiates COT, Cat-1 LBT and Cat-2 LBT may not apply. If the UE is to transmit an uplink burst in a gNB COT, the UE may perform Cat-1 LBT if the gap is within 16 μs, and perform Cat-2 LBT if the gap is greater than 16 μs. As discussed above, it should be noted that the Cat-2 LBT for FBE may be different from Cat-2 LBT (25 μs or 16 μs) in LBE. In some aspects, one 9 μs measurement right before the transmission may be needed, with at least 4 μs for measurement. This may be referred to as a one-shot LBT.

A node (e.g., the BS 305a or the BS 305b) interested in using a FFP 352 for communication may contend for the channel during the gap period 354 preceding the desired FFP 352, for example, by performing an LBT to determine whether another node may have reserved the same frame period 352. If the LBT is successful, the node may transmit an indication of a reservation for the FFP 332 during COT 356 so that other nodes may refrain from using the same FFP 352. The LBT can be based on energy detection or signal detection. The reservation indication can be a predetermine sequence or waveform or any suitable signal. If the LBT is unsuccessful, the node may back off until the start of a next gap period 354, where the node may attempt another contention during the gap period 354 for the following FFP 352.

While FIG. 3B illustrates a gap period 354 for a particular FFP 352 being located at the end of FFP 352, in some instances, the gap period 354 can be located at the beginning of FFP 352. In either case, the gap period 354 between COTs 356 may be used for contention for the next COT 356.

In the illustrated example of FIG. 3B, the BS 305a and the BS 305b may contend for the FFPs 352 during corresponding gap periods 354. The BS 305a may win the contention for the first FFP 352 illustrated while the BS 305b may win the contention for the next frame period 352. After winning a contention, the BS 305a or the BS 305b may schedule DL communication and/or UL communication with the UE 315a or the UE 315b, respectively, within the corresponding non-gap duration or transmission period 356. The DL communication may include DL control information (e.g., PDCCH control information) and/or DL data (e.g., PDSCH data). The UL communication may include UL control information (e.g., PDCCH control information), PRACH signals, random access messages, periodic-sounding reference signals (p-SRSs), and/or UL data (e.g., PUSCH data). For instance, the BS 305a may transmit a DL scheduling grant (e.g., PDCCH scheduling DCI) or a UL scheduling grant (e.g., PDCCH scheduling DCI) for a DL communication or a UL communication with the UE 315a during the frame period 352. The UE 315a may monitor for scheduling grants from the BS 305a and transmit UL communication to the BS 305a or receive DL communication from the BS 305a according to the grants.

In some embodiments, the BS 305a may transmit a PDCCH signal at the beginning of the transmission period 356 to signal to the UE 315a that the BS 305a has won the contention for FFP 352. In some instances, the PDCCH signal may include a group common-PDCCH (GC-PDCCH) DCI signaling to a group of UEs served by the BS 305a that the BS 305a has won the contention for FFP 352 so the UEs may monitor for PDCCH from the BS 305a. In some instances, the GC-PDCCH may include a slot format indication (SFI) indicating transmission directions assigned to symbols within the COT 356 of FFP 352. The indication of the BS 350a winning access to FFP 352 may generally be referred to as a COT indication.

Additionally, once the BS 305a or the BS 305b won the contention for a frame period 352, FFP 352 is used exclusively by the BS 305a or the BS 305b who won the contention. Thus, the BS 305a or the BS 305b can leave an idle period (shown as blank boxes) with no transmission in FFP 352. When operating in the FBE mode, another node may not occupy the channel during the idle period since contention may occur during the gap periods 354.

In some embodiments, the BS 305a may configure the UE 315a with configured grants or configured resources for configured UL transmissions. The configured grants or resources may be periodic. When a configured resource or grant is within FFP 356 of the frame period 352, the UE 315a may monitor for a COT indication from the BS 305a during the frame period 352. Upon detecting a COT indication from the BS 305a, the UE 315a may transmit using the configured grant resource in the frame period 352.

As discussed above, when operating in an FBE communication mode, FFPs 352 and the gap periods 354 are predetermined are known prior to communications in the FBE mode. Accordingly, the present disclosure provides techniques to signal FBE structures for FBE communication over a shared radio frequency band. The present disclosure also provide techniques to enable UEs (e.g., the UEs 115 and/or 315) to access a network (e.g., the networks 100 and/or 300) when the network operates in an FBE mode. In particular, embodiments of the present invention provide access to a UE 115 to provide an UL transmission at the beginning of following FFPs 352.

Figure 4:
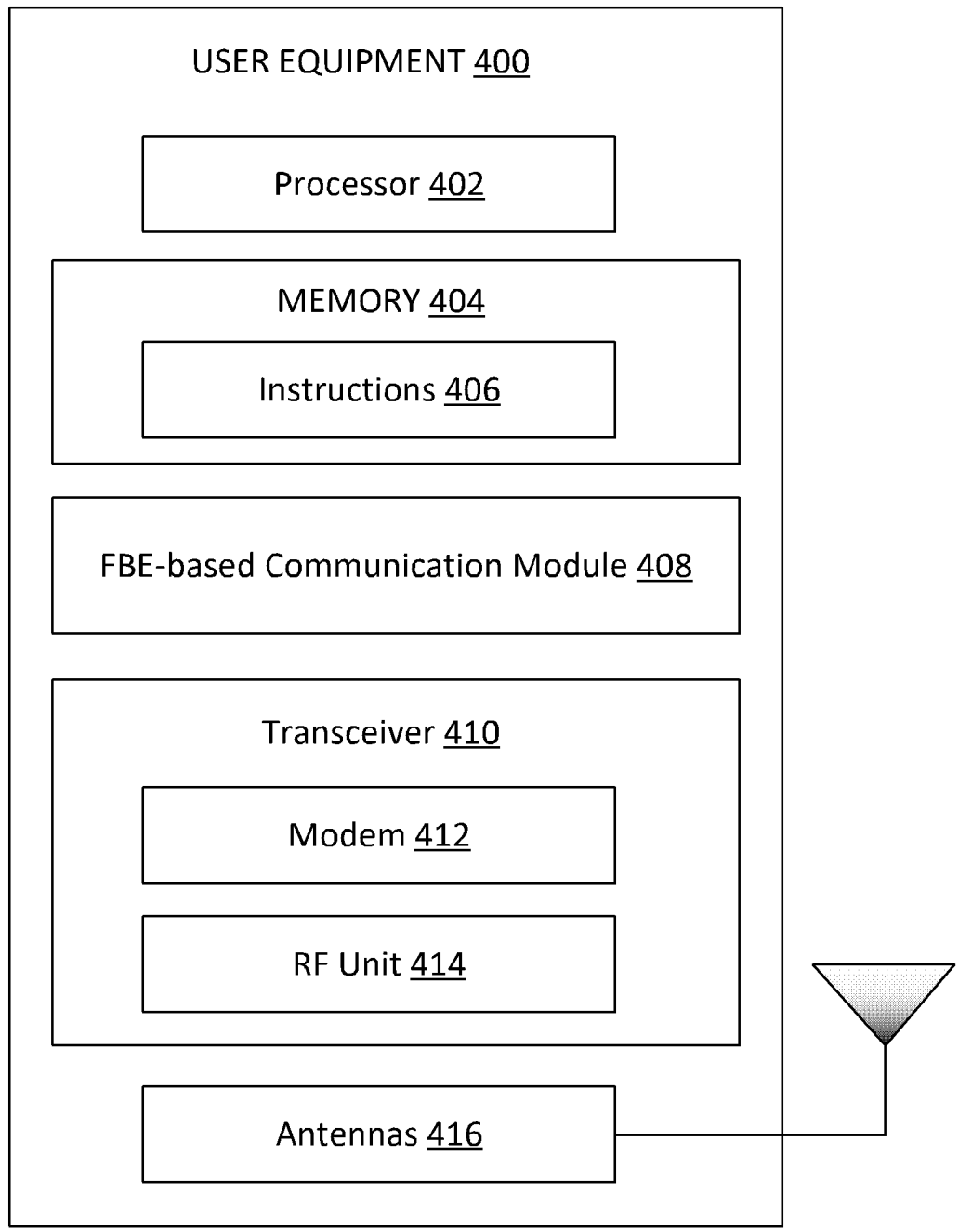
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1. As shown, the UE 400 may include a processor 402, a memory 404, an FBE-based communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 2, 3A-3B, and 6-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The FBE-based communication module 408 may be implemented via hardware, software, or combinations thereof. For example, the FBE-based communication module 408 may be implemented as a processor, circuit, and/or instructions 406 stored in the memory 404 and executed by the processor 402. In some instances, the FBE-based communication module 408 can be integrated within the modem subsystem 412. For example, the FBE-based communication module 408 can be implemented by a combination of software components (e.g., executed by a DSP or a general processor) and hardware components (e.g., logic gates and circuitry) within the modem subsystem 412.

The FBE-based communication module 408 may be used for various aspects of the present disclosure, for example, aspects of aspects of FIGS. 2, 3A-3B, and 6-10. The FBE-based communication module 408 is configured to receive a system information signal from a BS (e.g., the BSs 105 and/or 305) indicating an FBE configuration and a PRACH configuration, transmit a PRACH signal based on the PRACH configuration to initial a random access procedure with the BS, and/or communicate UL communications (e.g., PUCCH and/or PUSCH) and/or DL communications (e.g., PDCCH and/or PDSCH) with the BS based on the FBE configuration.

In some aspects, the system information signal may indicate either an FBE contention mode or a load based equipment (LBE) contention mode. The FBE configuration may indicate a duration of the frame period, a duration of the gap period, a frame boundary alignment between the frame periods and radio frames. In some instances, the FBE configuration may indicate the duration of the gap period in units of symbols or slots. In some instances, when the FBE configuration does not include a duration for the gap period, the FBE-based communication module 408 is configured to compute the duration for the gap period based on the duration of the frame period and a minimum duration of the gap period with respect to the frame period. In some instances, the FBE configuration may indicate a number of symbols or slots for the gap period in addition to the minimum duration.

In some aspects, the system information signal may indicate a physical random access channel (PRACH) configuration. In some instances, the PRACH configuration may indicate that a UE may transmit a PRACH signal during a frame period acquired by the BS. In some instances, the PRACH configuration may indicate that a UE may transmit a PRACH signal during any gap period based on a successful contention. In some instances, the PRACH configuration may indicate that a UE may autonomously transmit a PRACH signal during any time based on reference channel occupancy duration parameter (e.g., regulated by authority). In some instances, the PRACH configuration may indicate that a UE may contend for a frame period for transmitting a PRACH signal and may share the acquired frame period with the BS. Mechanisms for FBE communication are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the FBE-based communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH control information, PRACH signals, PUSCH data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., SSBs, RMSI, MIB, SIB, FBE configuration, PRACH configuration PDCCH, PDSCH) to the FBE-based communication module 408 for processing. The antennas 416 may include multiple antennas of similar or different designs in order to sustain multiple transmission links. The RF unit 414 may configure the antennas 416.

In an example, the transceiver 410 is configured to receive, from a BS, system information including an FBE configuration indicating a plurality of frame periods, each including a gap period for contention at the beginning of the frame period, and communicate with the BS based on the FBE configuration, for example, by coordinating with the FBE-based communication module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
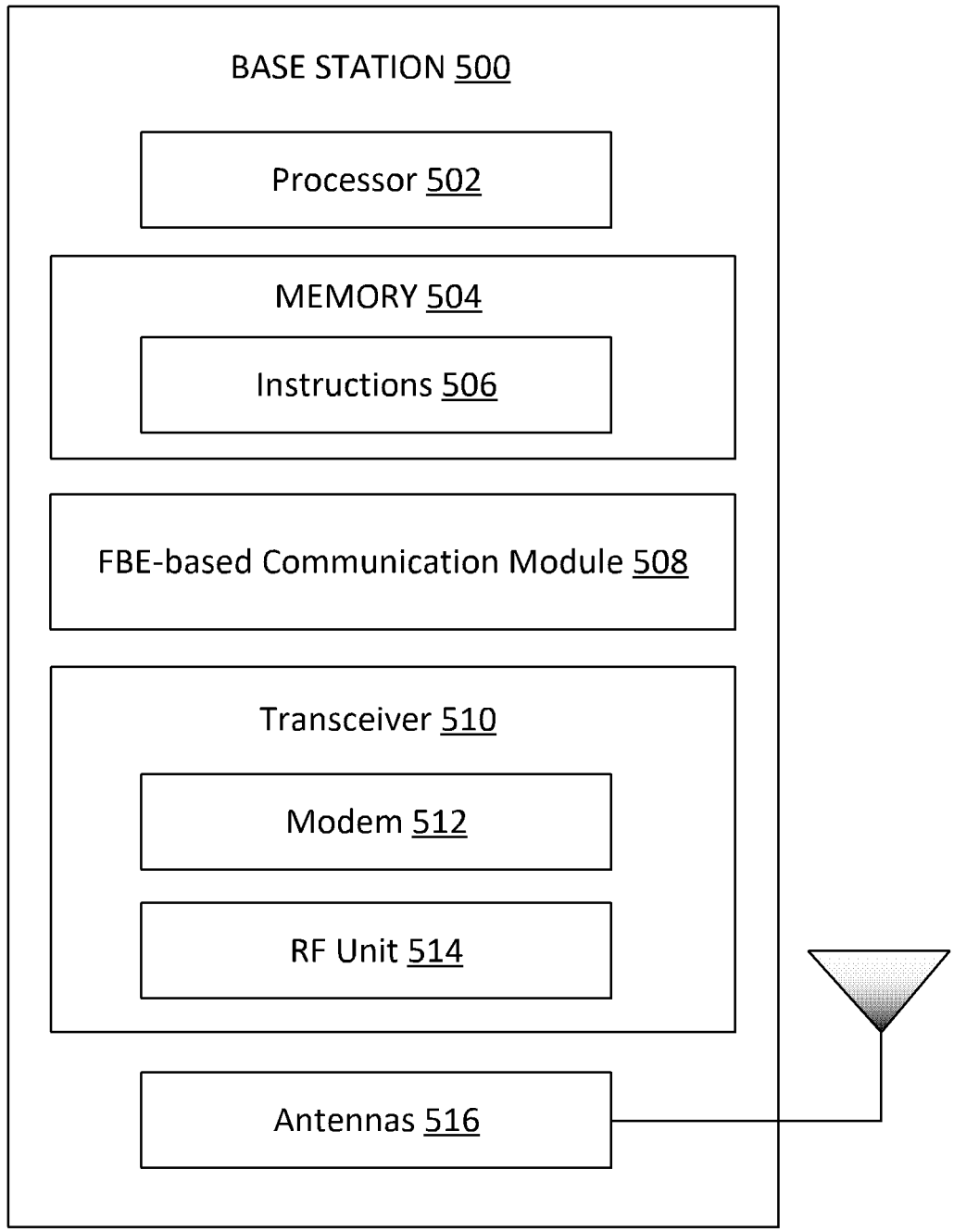
FIG. 5 is a block diagram of an exemplary base station (BS) according to some embodiments of the present disclosure.

FIG. 5 is a block diagram of an exemplary BS 500 according to some aspects of the present disclosure. The BS 500 may be a BS 105 in the network 100 as discussed above in FIG. 1. A shown, the BS 500 may include a processor 502, a memory 504, an FBE-based communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2, 3A-3B, and 6-10. Instructions 506 may also be referred to as code, which may be interpreted broadly to include any type of computer-readable statement(s) as discussed above with respect to FIG. 4.

The FBE-based communication module 508 may be implemented via hardware, software, or combinations thereof. For example, the FBE-based communication module 508 may be implemented as a processor, circuit, and/or instructions 506 stored in the memory 504 and executed by the processor 502. In some instances, the FBE-based communication module 508 can be integrated within the modem subsystem 512. For example, the FBE-based communication module 508 can be implemented by a combination of software components (e.g., executed by a DSP or a general processor) and hardware components (e.g., logic gates and circuitry) within the modem subsystem 512.

The FBE-based communication module 508 may be used for various aspects of the present disclosure, for example, aspects of aspects of FIGS. 2, 3A-3B, and 6-10. The FBE-based communication module 508 is configured to transmit a system information signal to a BS (e.g., the UEs 115, 315, and/or 400) indicating an FBE configuration and a PRACH configuration, receive a PRACH signal from the UE based on the PRACH configuration, and/or communicate UL communications (e.g., PUCCH and/or PUSCH) and/or DL communications (e.g., PDCCH and/or PDSCH) with the UE based on the FBE configuration.

In some aspects, the system information signal may indicate either an FBE contention mode or an LBE contention mode. The FBE configuration may indicate a duration of the frame period, a duration of the gap period, a frame boundary alignment between the frame periods and radio frames. In some instances, the FBE configuration may indicate the duration of the gap period in units of symbols or slots. In some instances, the FBE-based communication module 408 is configured to compute the duration for the gap period based on the duration of the frame period and a minimum duration of the gap period with respect to the frame period. In some instances, the FBE configuration may indicate a number of symbols or slots for the gap period in addition to the minimum duration.

In some aspects, the system information signal may indicate a physical random access channel (PRACH) configuration. In some instances, the PRACH configuration may indicate that a UE may transmit a PRACH signal during a frame period acquired by the BS 500. In some instances, the PRACH configuration may indicate that a UE may transmit a PRACH signal during any gap period based on a successful contention. In some instances, the PRACH configuration may indicate that a UE may autonomously transmit a PRACH signal during any time based on reference channel occupancy duration parameter (e.g., regulated by authority). In some instances, the PRACH configuration may indicate that a UE may contend for a frame period for transmitting a PRACH signal and may share the acquired frame period with the BS. Mechanisms for FBE communication are described in greater detail herein.

As shown, the transceiver 510 may include the modem subsystem 512 and the RF unit 514. The transceiver 510 can be configured to communicate bi-directionally with other devices, such as the UEs 115 and/or 300 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH) from the modem subsystem 512 (on outbound transmissions) or of transmissions originating from another source such as a UE 115, the UE 315, and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 215 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUCCH control information, PRACH signals, PUSCH data) to the FBE-based communication module 508 for processing. The antennas 516 may include multiple antennas of similar or different designs in order to sustain multiple transmission links.

In an example, the transceiver 510 is configured to transmit, to a UE, system information including an FBE configuration indicating a plurality of frame periods, each including a gap period for contention at the beginning of the frame period, and communicate with the UE based on the FBE configuration, for example, by coordinating with the FBE-based communication module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

An aspect of the present disclosure is the application of the FBE-based communications to unlicensed frequency spectrum may be used for ultra-reliable low-latency communication (URLLC) and industrial internet of things (IIoT) applications that involve a controlled environment. A controlled environment may be an environment that is controlled such that there will be no other radio access technology (RAT) or other operators operating in the coverage area. An LBT procedure may thus always pass, even if performed for an FBE device. More generally, even though a factory owner or operator can clear the environment, there may still be a chance that some other RAT is operating. In some embodiments, for a Wi-Fi device, an access probe may be transmitted from a station even when the access point is not deployed. The factory can enforce a rule that no Wi-Fi access points are to be deployed in the factory floor, but it may be hard to make sure that no employee brings in a smart phone. Thus, there is a small chance that a gNB LBT procedure may fail.

With further reference to FIG. 3B, in FBE mode there is processing time that occurs at the UE 315 to communications that are received from BS 305. This processing time occurs between the time when BS 305 transmits a COT indicator to when UE 315 receives and interprets that indicator. A similar time processing time occurs when UE 315 receives a PDCCH with a DCI for scheduling an UL transmission and when UE 315 interprets that DCI. Consequently, this processing time in UE 315 is wasted time for scheduling UL transmission. This presents several different case scenarios, some of which are specifically discussed below. Embodiments according to this disclosure can result in better utilization of the resources available.

In a first case scenario, BS 305 does not have downlink data for transmission, but there is demand for transmission of UL data. Therefore, BS 305 contends for the channel at the beginning of FFP 352 to provide for UL transmission (e.g., dynamic scheduling or CG-UL scheduling) that is needed in UE 315. In this scenario, gNB 305 obtains access to the channel at FFP 352 if a LBT passes and transmits a DL signal with a COT indicator. UEs 315 can then transmit UL data after a process time on condition of DL signal/channel has been detected. The resource during the process time is wasted since gNB 305 transmits nothing in this duration. The DL signal itself may not be necessary if it is used for triggering UL transmission in UEs 315, which may reduce the latency of UL data.

In a second case scenario, the LBT fails when gNB 305 contends for the channel at the beginning of the FFP 352. This results under normal circumstances with no transmission of DL data and no transmission of UL data. UE 315 cannot transmit UL data because no DL signals are detected.

In a third case that may be applicable to an ultra-reliable low-latency communications (URLLC) environment, there may be a need to schedule UE UL transmission (PUCCH or PUSCH for URLLC DL/UL traffic respectively) at the beginning of the FFP 352. If there is a wait for the processing time to occur in UE 315, the timeline requirement from certain URLLC services may not be satisfied.

Embodiments of the present disclosure help alleviate these issues in the use of resources. According to various embodiments described here, UE 315 may transmit uplink data during a COT indicator processing time such that time resources of an FFP 352 are not wasted. IF UE 314 is able to transmit uplink data during the FFP 352 and not wait until a later FFP 352, services may not be interrupted. UE 315 may transmit uplink data in a first part of an FFP 352 based at least in part on grant information received during a previous FFP 352. UE 315 may not need to rely on receipt of a COT indicator from a successful LBT by gNB 305. If the LBT is successful, UE 315 may not wait until after the COT indicator is processed to transmit data, thus also saving resources and avoiding service interruptions.

Figure 6:
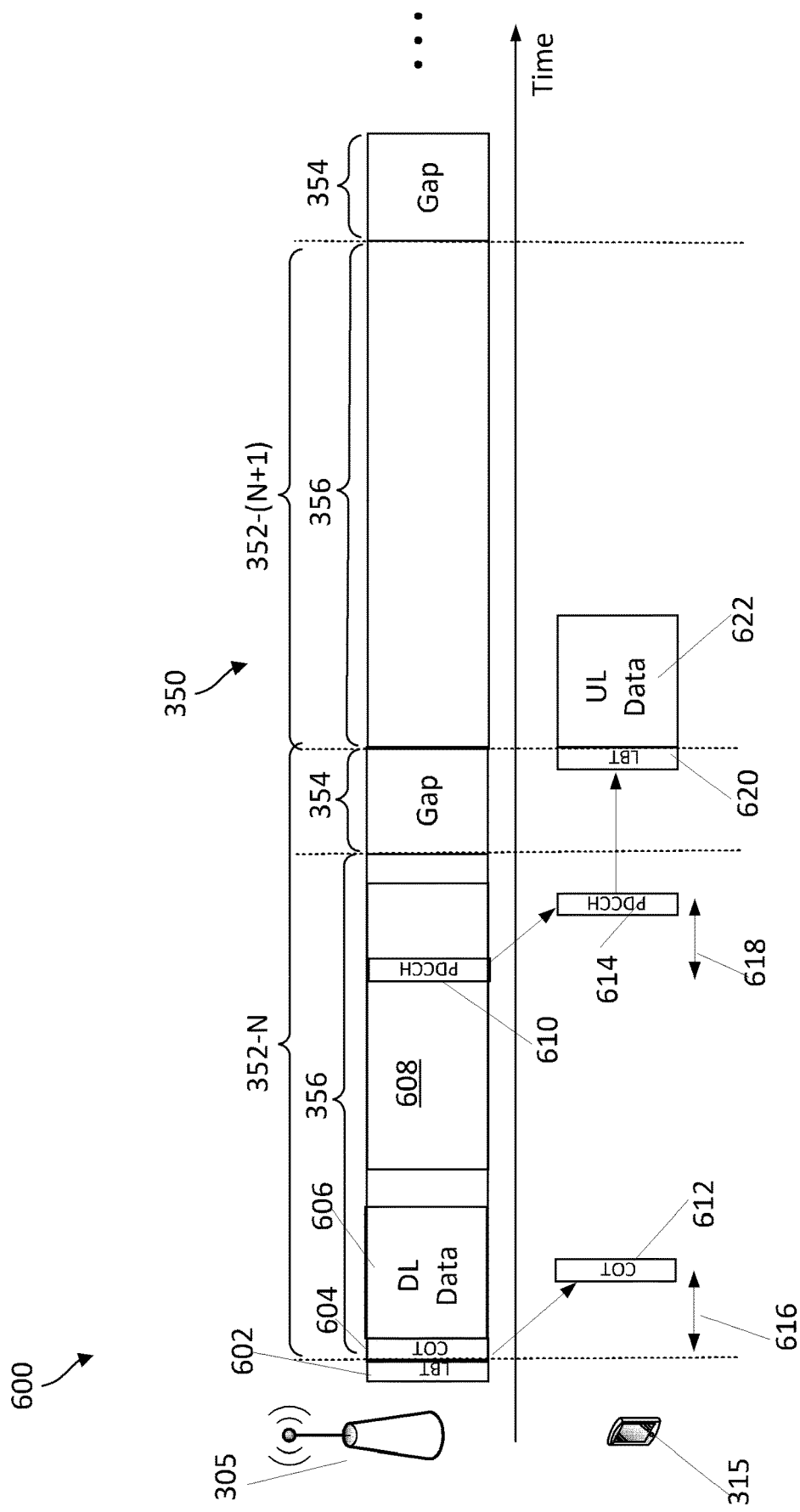
FIG. 6 illustrates a signaling diagram between a BS and a UE according to some embodiments of the present disclosure.

FIG. 6 illustrates an example communication 600 in FBE mode between gNB 305 and UE 315 according to some embodiments of the present disclosure. In particular, communication 600 results in transmission of UL data 622 at the start of second FFP 352-(N+1) in FBE mode as a result of a COT trigger initiated in UE 315 by gNB 305.

As illustrated in FIG. 6, a base station gNB 305 is in communication with UE 315. BS 305 is further illustrated above in FIGS. 1, 3A, and 5, for example. UE 315 is further illustrated above in FIGS. 1, 3A, and 4, for example. FIG. 6 illustrates operation of both BS 305 and UE 315 in FBE mode using a sequence of FFPs 352.

As is illustrated in FIG. 6, BS 305 performs an LBT 602 in the idle period 354 prior to the first FFP 352-N. As discussed above, LBT 602 can be a 9 μs one-shot LBT. If LBT 602 fails, then gNB 305 loses contention to FFP 352-N and consequently does not transmit DL data during COT 356 of FFP 352-N.

If LBT 602 is successful, as is the case in the example illustrated in FIG. 6, then gNB 305 transmits a COT indication 612 at initiation of COT 356 of FFP 352-N. gNB 305 can then transmit DL data 606 during the COT period 356 of FFP 352. Further, as is illustrated, a DCI can be transmitted during a PDCCH 610. In accordance with embodiments of the present disclosure, PDCCH 610 can be constrained to be transmitted during a particular window 608 in COT 356. In an aspect, a start and duration of window 608 may be pre-defined. For example, the start of window 608 may be a fixed offset relative to a start of COT 356, and the duration may be a fixed number of symbols. In another aspect, a start (e.g., starting symbol) and duration (e.g., number of symbols) of window 608 may be configured, via a high layer parameter. It is understood that the start and/or duration of the window may depend on the duration of the COT.

Accordingly, gNB 305 may contend for the second FFP 352-(N+1) illustrated in FIG. 6 as well. However, with or without contention for the second FFP 352, gNB 305 may expect UL data during the beginning of the second FFP 352 in accordance with the DCI transmitted in PDCCH 610 provided that the DCI indicates availability for UL data transmission.

As is further illustrated in FIG. 6, if LBT 602 is successful for gNB 305, then UE 315 receives COT indicator 612. As illustrated in FIG. 6, and discussed above, COT indicator 612 is processed in UE 315 during a processing time 616 after completion. If LBT 602 fails, then COT indicator 612 may not be transmitted. If a COT indicator 612 is received, then UE looks to receive a DCI with an UL grant in a PDCCH 610. If PDCCH 610 is transmitted, then it is processed by UE 315 and after a delay 618. The DCI received in PDCCH 610, can trigger a UL transmission from UE 315 at the beginning of a subsequent 352. In particular, the DCI in PDCCH 610 triggers UL transmission, introducing an indicator to inform UE 315 to use its own FFP 352 (in this case 352-(N+1)) for the UL transmission instead of relying on the gNB 305 DL signal/channel detection for the transmission. The DCI can be used to trigger PUSCH or a PUCCH.

As is illustrated in FIG. 6, in response to the DCI received in PDCCH 610, UE 315 may transmit UL data 622 during the beginning of the subsequent FFT 352-(N+1). In some embodiments, UE 315 may perform an LBT 620 in gap 354 prior to FFT 352-(N+1).

As illustrated in FIG. 6, window 608 in which a DCI can be perceived in PDCCH 610 assists in capturing the UE COT trigger. In some embodiments, the UE COT trigger may be a single bit of the DCI in PDCCH 610 in window 608. The DL and UL granting uplink transmission will not start the COT directly. However, if a DCI with a trigger bit set to 1 in window 608 is detected, then UE 315 can start COT 356 of FFP 352-(N+1) and transmit the UL data 622 according to the RRC configuration for UL data transmission.

Figure 7:
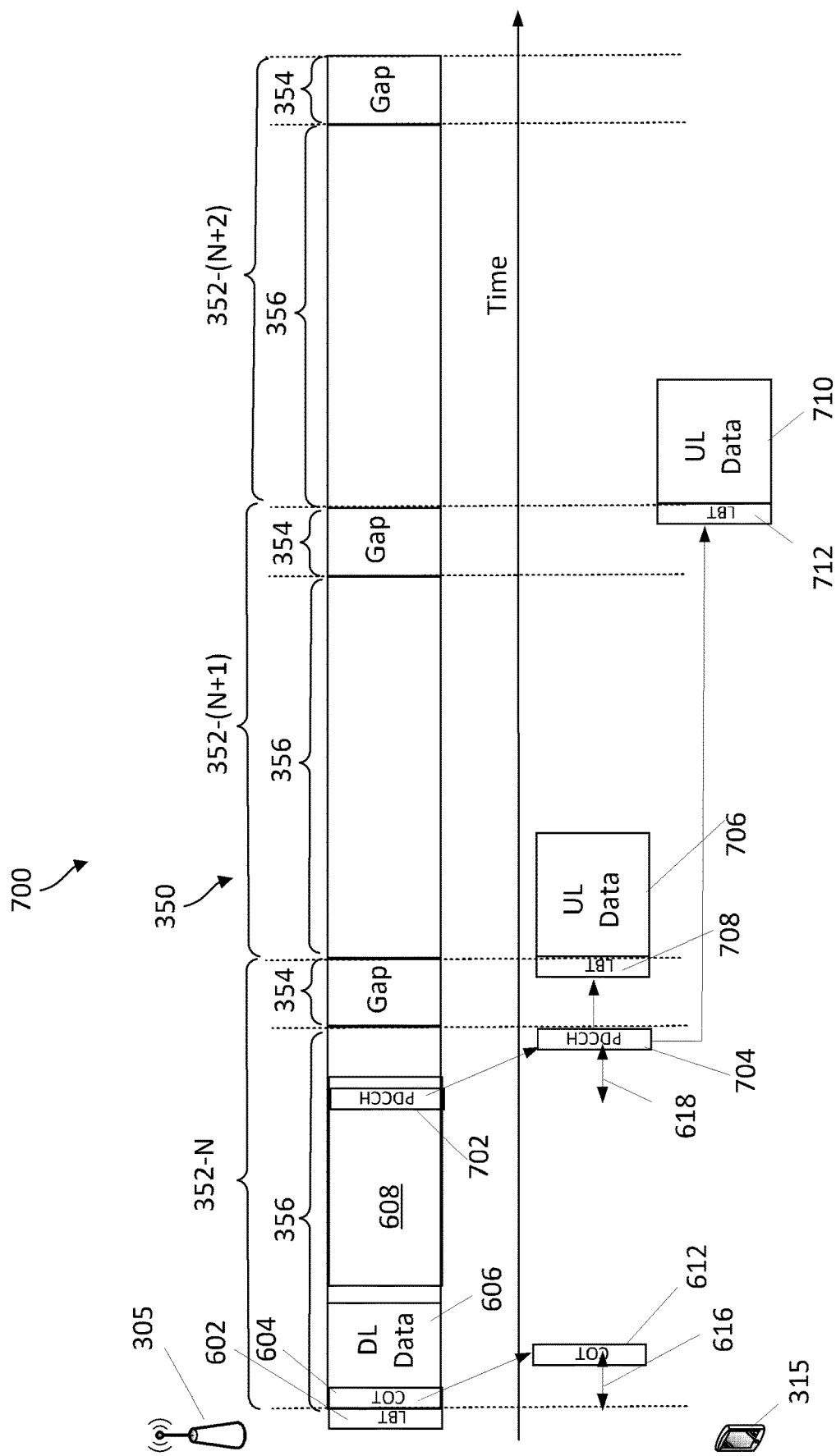
FIG. 7 illustrates another signaling diagram between a BS and a UE according to some embodiments of the present disclosure.

In communications 600 illustrated in FIG. 6, the DCI in PDCCH 610 can include a single bit to trigger the UE 315 to upload data in the beginning of the second FFP 352-(N+1). FIG. 7 illustrates a communication 700 where the DCI includes two or more bits for this triggering. In communications 700, the DCI can inform UE 315 to use multiple subsequent FFPs 352 for UL data transmission. As illustrated in FIG. 7, a DCI in PDCCH 702 is included within window 608. The DCI in PDCCH 702 includes two or more trigger bits indicating whether UL Data can be transmitted in subsequent FFPs 352. In a two-bit system for example, "00" can indicate that UE 315 cannot transmit UL data at the beginning of any subsequent FFPs 352; "01" can indicate that UE 315 can transmit UL data at the beginning of the subsequent FFP, FFP 352-(N+1); "10" can indicate that UE 315 can transmit UL data at the beginning of the following two FFPs, FFP 352-(N+1) and FFP 352-(N+2); and "11" can indicate that UE 315 can transmit UL data at the beginning of the following three FFPs, FFP 352-(N+1), FFP 352-(N+2), and FFP 352-(N+3).

As illustrated in FIG. 7, gNB 305 obtains a successful LBT 602 and provides a COT indicator 604. Further, as discussed above, gNB 305 can provide DL data 506 during COT 356. Further, during a window 608, gNB provides a DCI as discussed above during PDCCH 702. As discussed above, in the embodiment illustrated in FIG. 7, the DCI includes two or more bits indicating whether UL data can be transmitted in subsequent FFPs 352.

As further illustrated in FIG. 7, UE 315 can receive and process COT indicator 604 to arrive at a COT result 612 in a processing time 616. As discussed above, when UE 315 recognizes COT indicator 604, it monitors for PDCCH 702 with a DCI in window 608. UE 315 then processes during process time 618 to determine from the COT trigger bits in the DCI to determine whether UL data can be transmitted and how many subsequent FFPs 352 can be used. In the particular example illustrated in FIG. 7, the DCI COT trigger bits indicate that the following two FFPs 352 can be used. Consequently, UE 315 performs a successful LBT 708 to transmit UL Data 706 at the beginning of FFP 352-(N+1) and performs a successful LBT 712 to transmit UL Data 710 at the beginning of FFP 352-(N+2).

It should be understood that any number of COT trigger bits can be used. Further, if LBT 708 fails, the UL Data 706 may not be transmitted and if LBT 712 fails, UL Data 710 may not be transmitted.

Figure 8:
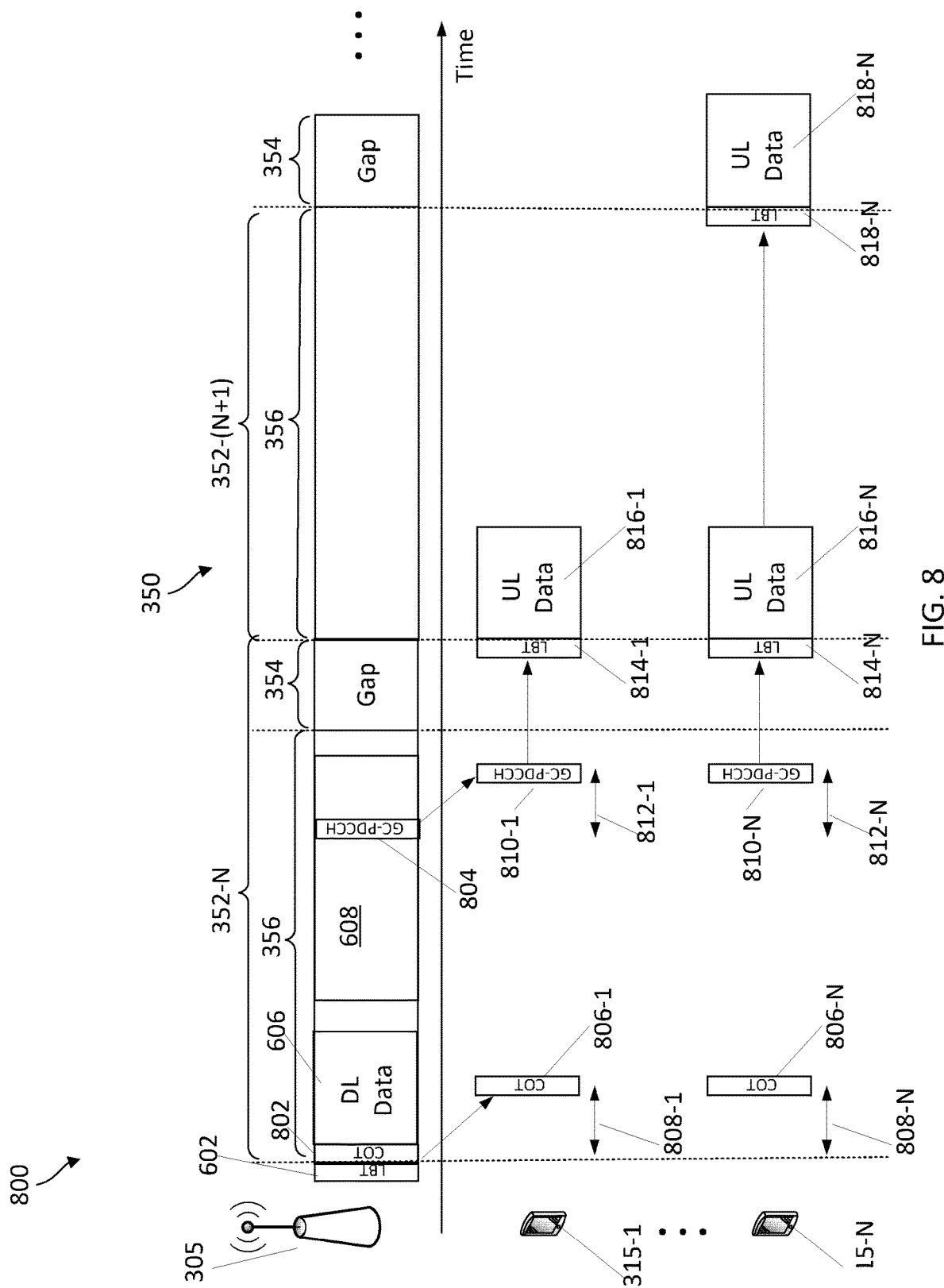
FIG. 8 illustrates a signaling diagram between a BS and a group of UEs according to some embodiments of the present disclosure.

FIG. 8 illustrates communication 800 between BS 305 and a group of UEs 315-1 through 315-N according to some embodiments. In particular, FIG. 8 illustrates use of group-common PDCCH (GC-PDCCH) to start UE COT for a pre-configured CG-PUSCH or other RRC configured UL transmission. In this case, the trigger bit or bits are provided in a DCI sent in a GC-PDCCH within window 608.

As is illustrated in FIG. 8, BS 305 performs LBT 602 as discussed above prior to FFP 352-N. If LBT 602 is successful, then BS 305 can transmit COT indicator 802. BS 305 can then transmit DL data 606 and, during window 608, GC-PDCCH 804 with a DCI directed towards the group of UEs 315-1 through 315-N.

As is further illustrated in FIG. 8, UEs 315-1 through 315-N receives and processes COT 802 during processing times 808-1 through 808-N to COT detections 806-1 through 806-N. When COT 802 is detected in COT 801-1 through 806-N, UEs 315-1 through 315-N monitors during window 608 for a GC-PDCCH 804. As is further illustrated, when GC-PDCCH 804 is detected in window 608 and processed during processing times 812-1 through 812-N to arrive at results PDCCH 812-1 through 812-N.

As discussed previously, detection of a DCI GC-PDCCH 804 can trigger a RRC configured UL to start the COT. In some embodiments, GC-PDCCH 804 can include a specifically formatted DCI to notify each UE 315-1 through 315-N to schedule UL transmission from each UE 315-1 through 315-N at a subsequent FFP 352. In some embodiments, GC-PDCCH 804 can introduce a new radio network temporary identification (RNTI), i.e. a COT trigger indicator RNTI (CTI-RNTI). For example, a new DCI format 2_7 can be used for UE COT triggering and may be scrambled with the new CTI-RNTI. In some embodiments, a standard format DCI can be used with a higher parameter introduced (e.g., COT-IndicatorPerCell-r17). For example, DCI format 2_0 may be used for UE COT triggering and may include an information field (e.g., COT indicator 1, COT indicator 2, COT indicator 3, etc.) that may be configured via the higher layer parameter.

In some embodiments, the DCI in GC-PDCCH 804 can be a one-bit bitfield. In that case, each of UE 315-1 through 315-N monitors the same bit in the DCI of GC-PDCCH 804. In that case, if the bit indicates that UL transmission can occur at the beginning of the following FFP 352, then as shown in FIG. 8 each UE 315-1 through 315-N with data to upload can contend for transmission in FFP 352-(N+1). As illustrated in FIG. 8, for example, UE 315-1 and UE 316-N both perform an LBT 814-1 and 814-N prior to FFP 352-(N+1) and the one that succeeds transmits UL data. If LBT 814-1 is successful, then UL data 816-1 is transmitted and if LBT 814-N is successful, then UL data 816-N is transmitted.

As discussed with respect to FIG. 7 above, the bitfield can be multi-bit indicating the number of FFPs 352 that can be used for to transmit UL data. In that case, each of UEs 315-1 through 315-N monitors the same bits and those that have UL data can contend for the next FFPs. As illustrated in FIG. 8, for example, if the multiple bits indicate that the next two FFPs can be used, then UE 315-N (with a winning LBT 814-N) can transmit UL Data 816-N in FFP 352-(N+1) and then proceed to contend for FFP 352-(N+2) by performing LBT 818-N prior to the beginning of FFP 352-(N+2) and, if successful, transmitting UL data 818-N at the beginning of FFP 352-(N+2).

In some embodiments, a more complicated DCI can be transmitted in GC-PDCCH 804. In that case, the DCI can include one or more bits that are directed individually to each of UEs 315-1 through 315-N. Consequently, during processing time 812-1 through 812-N UEs 315-1 through 315-N determines from the DCI in GC-PDCCH 804 whether it individually has an indicator to transmit UL data in a subsequent FFP 352. In some embodiments, the DCI in GC-PDCCH 804 can include a one-bit determination for each UE 315-1 through 315-N indicating which of UEs 315-1 through 315-N, if any, can transmit UL data at the beginning of FFP 352-(N+1). In some embodiments, the DCI in GC-PDCCH 804 can include more than one bit directed at each of UEs 315-1 through 315-N indicating how many following FFPs can be used. In some embodiments, the DCI in GC-PDCCH 804 can include more than one bit indicating to each of UEs 315-1 through 315-N a particular following FFP that it can use for transmission of UL data.

Figure 9:
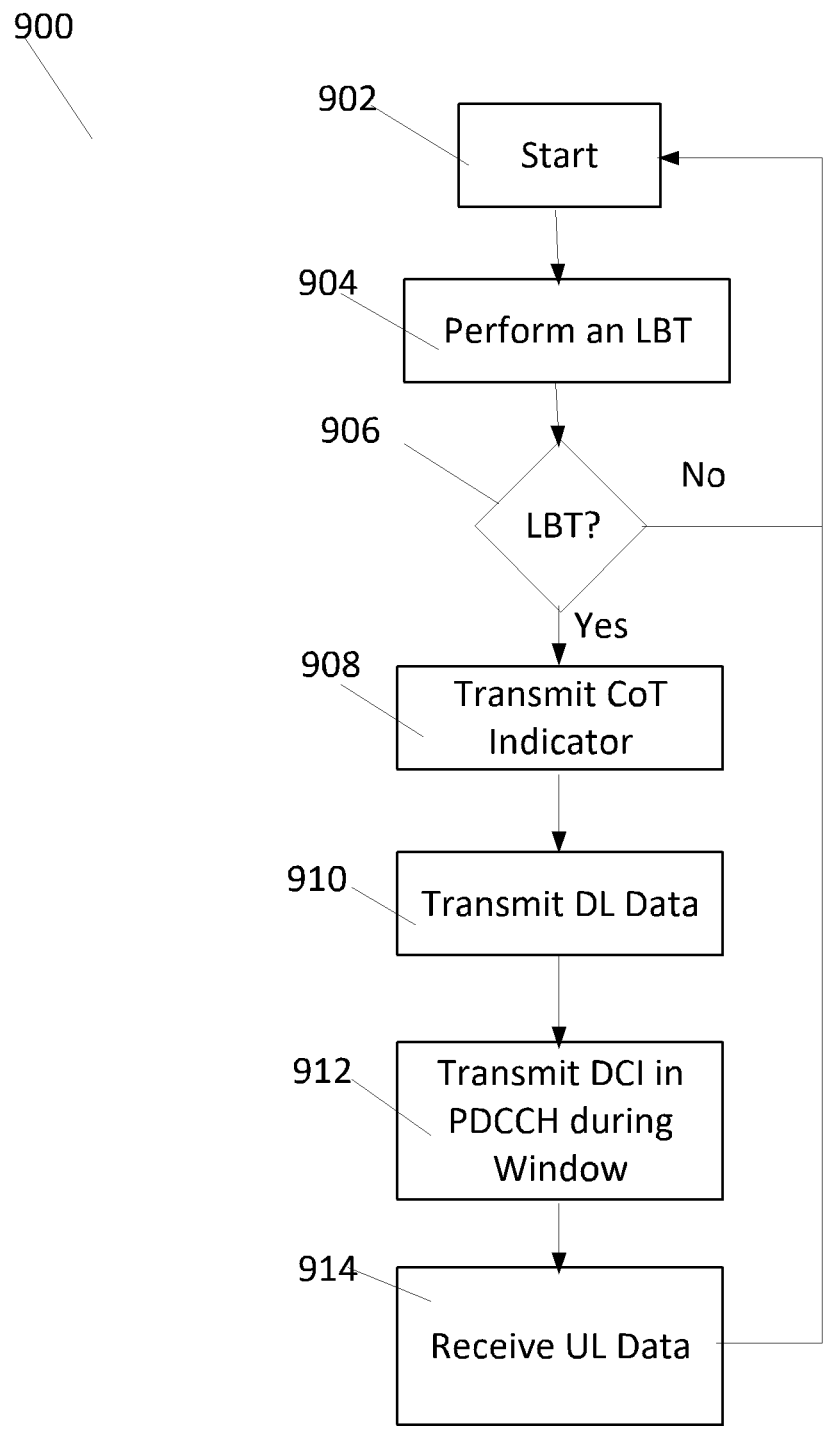
FIG. 9 illustrates an algorithm operable on a BS according to embodiments of this disclosure.

FIG. 9 indicates an algorithm 900 that can be operated on BS 305, which may have a structure as described in FIG. 5, in accordance with some embodiments of this disclosure. FIG. 9 illustrates, for example, algorithm 900 can be executed in ME-based communications module 508 of BS 500 as illustrated in FIG. 5. As illustrated in FIG. 9, algorithm 900 starts in step 902. In step 904, BS 305 can perform an LBT such as LBT 602 illustrated in FIGS. 6-8. In step 906, BS 305 if the LBT is successful, then algorithm 900 proceeds to step 908. If unsuccessful, then algorithm 900 returns to start step 902.

In step 908 of algorithm 900, BS 305 may transmit a COT indicator such as COT indicator 604 illustrated in FIGS. 6 and 7 or COT indicator 802 illustrated in FIG. 8. Algorithm 908 may then proceed to step 910 where DL data 606 is transmitted if DL data is available. In step 912, BS 305 transmits DCI within the window. As is illustrated in FIGS. 6 and 7, DCI data is transmitted in PDCCH 610 and PDCCH 702, respectively. As discussed above, the DCI as illustrated in FIG. 6 includes a one-bit trigger to indicate the availability to transmit UL data at the beginning of the subsequent FFP. The DCI as illustrated in FIG. 7 includes a multi-bit trigger to indicate the availability to transmit UL data the beginning of a number of subsequent FFPs as indicated. The DCI as illustrated in FIG. 8 indicates to multiple UEs in a group whether following FFPs are available for UL data transmission and may also indicate which UEs in the group to transmit and how many following FFPs are available for UL data transmission.

In step 914 of algorithm 900, BS 305 receives UL data that has been transmitted at the beginning of the subsequent FFP 352 as illustrated in FIGS. 6-8. Once complete, algorithm 900 then returns to start step 902.

Figure 10:
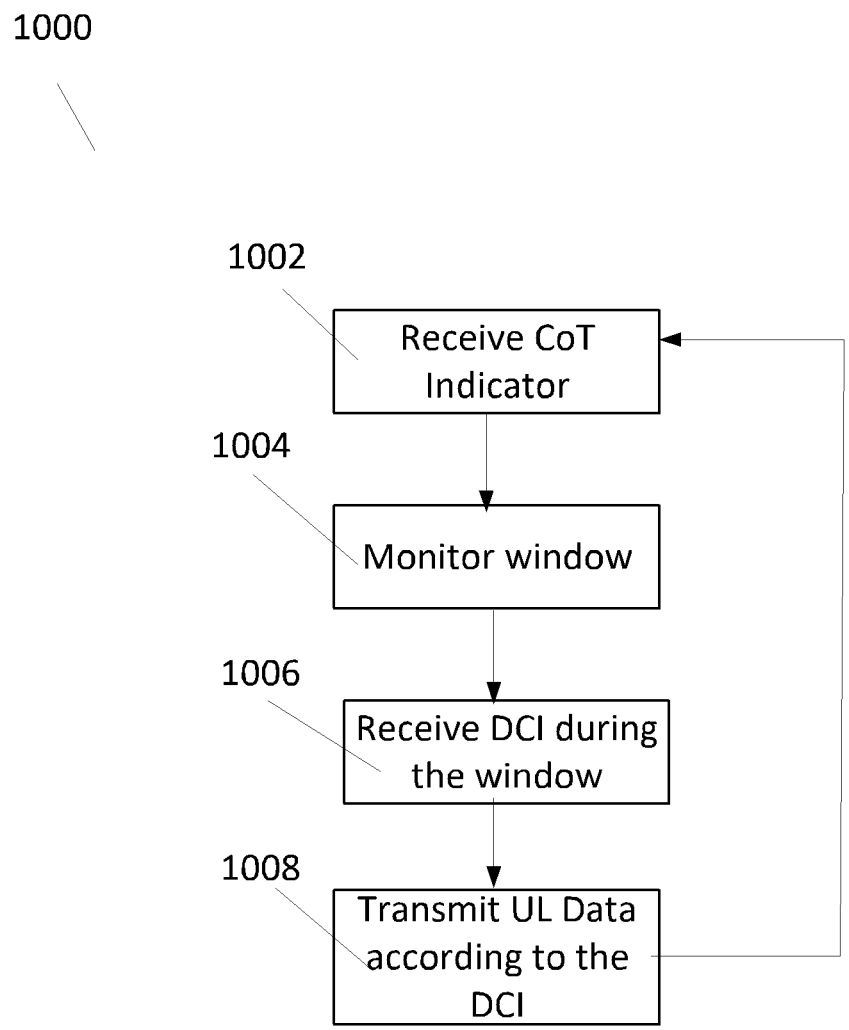
FIG. 10 illustrates an algorithm operable on a UE according to embodiments of this disclosure.

FIG. 10 illustrates an algorithm 1000 that can operate on a UE 315, which may have a structure as described in FIG. 5, in accordance with some embodiments of this disclosure. FIG. 10 illustrates, for example, algorithm 1000 that can be executed in FBE-based Communication Module 408 of UE 400 illustrated in FIG. 4. As illustrated in FIG. 10, UE 315 starts algorithm 1000 at step 1002 when it receives a COT indicator. The COT indicator processing arrives at a result COT indicator 612 as indicated in FIGS. 6 and 7 or COT indicator 806 as indicated in FIG. 8. Once it is determined that a COT indicator has been received, then UE 315 executing algorithm 1000 monitors a window 608 to receive a DCI in a PDCCH in step 1004. In step 1006, a PDCCH with a DCI is received by UE 315 and interpreted to determine whether subsequent FFPs are available for UL data transmission. In step 1008 of algorithm 1000, UE 315 transmits UL data according to the DCI. As discussed above, the DCI can indicate whether or not the subsequent FFP 352 is available for UL data transmission or how many subsequent FFPs 352 (see FIG. 3) are available for UL Data transmission. In a GC-PDCCH 804 as illustrated in FIG. 8, the DCI can indicate whether an individual UE is provided permission to transmit UL data at the beginning of subsequent FFPs 352.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of operating a base station (BS), comprising:
   transmitting a channel occupancy time (COT) indicator in a first fixed frame period (FFP) to a user equipment (UE) in frame-based equipment (FBE) mode;
   transmitting downlink control information (DCI) during a window of the first FFP, wherein transmitting DCI during the window includes transmitting the DCI in a group-common physical downlink control channel (GC-PDCCH), wherein the DCI is associated with a COT trigger indicator new radio network temporary identifier (CTI-RNTI); and
   receiving uplink (UL) data from the UE during a second FFP following the first FFP according to the DCI.

2. The method of claim 1, wherein the DCI includes a single bit that indicates whether transmission of UL data can be performed by the UE at a beginning of the second FFP.

3. The method of claim 1, wherein the DCI includes two or more bits that indicate to the UE a number of following FFPs can be used for UL data.

4. The method of claim 1, wherein the DCI notifies each UE in a group whether a UL transmission can be performed at a beginning of a subsequent FFP.

5. The method of claim 1, wherein the DCI includes DCI format 2_0 associated with a configured higher layer parameter for UE COT triggering.

6. The method of claim 1, wherein the DCI includes a one-bit field that is monitored by multiple UEs in a group.

7. The method of claim 1, wherein the DCI includes multiple bits that provide indication to multiple UEs.

8. A method of operating a user equipment (UE), comprising:
   receiving a channel occupancy time (COT) indicator in a first fixed frame period (FFP) from a base station (BS) in frame-based equipment (FBE) mode;
   monitoring a window of the first FFP;
   receiving downlink control information (DCI) during the window, wherein receiving DCI during the window includes receiving the DCI in a group-common physical downlink control channel (GC-PDCCH), wherein the DCI is associated with a COT trigger indicator new radio network temporary identifier (CTI-RNTI); and
   transmitting uplink (UL) data to the BS during a second FFP following the first FFP according to the DCI.

9. The method of claim 8, wherein transmitting UL data includes determining from a one-bit of the DCI whether transmission of the UL data can be performed by the UE at a beginning of the second FFP.

10. The method of claim 8, wherein transmitting UL data includes determining from two or more bits of the DCI whether transmission of the UL data can be performed by the UE during a number of following FFPs.

11. The method of claim 8, wherein transmitting UL data includes determining from the DCI whether a UL transmission can be performed by a UE at a beginning of a subsequent FFP.

12. The method of claim 11, wherein determining from the DCI includes monitoring a one-bit field that is monitored by multiple UEs in a group.

13. The method of claim 11, wherein determining from the DCI includes monitoring a particular bit assigned to the UE from multiple bits that provide indication to multiple UEs.

14. The method of claim 11, wherein determining from the DCI includes monitoring a plurality of bits in the multiple bits directed to the UE that indicate which subsequent FFPs are available for UL transmission by the UE.

15. A base station (BS), comprising:
   a transceiver; and
   a frame-based equipment (FBE) communications module coupled to the transceiver, the FBE communications module configured to execute instructions to
      transmit a channel occupancy time (COT) indicator in a first fixed frame period (FFP) to a user equipment (UE) in FBE mode,
      transmit downlink control information (DCI) during a window of the first FFP, wherein transmitting DCI during the window includes transmitting the DCI in a group-common physical downlink control channel (GC-PDCCH), wherein the DCI is associated with a COT trigger indicator new radio network temporary identifier (CTI-RNTI), and
      receive uplink (UL) data from the UE during a second FFP following the first FFP according to the DCI.

16. The BS of claim 15, wherein the DCI includes a single bit that indicates whether UL data transmitted by the UE at a beginning of the second FFP.

17. The BS of claim 15, wherein the DCI includes two or more bits that indicate to the UE a number of following FFPs can be used for transmission of UL data.

18. The BS of claim 15, wherein the DCI notifies each UE in a group whether a UL transmission can be performed at a beginning of a subsequent FFP.

19. The BS of claim 15, wherein the DCI includes DCI format 2_0 associated with a configured higher layer parameter for UE COT triggering.

20. The BS of claim 15, wherein the DCI includes a one-bit field that is monitored by multiple UEs in a group.

21. The BS of claim 15, wherein the DCI includes multiple bits that provide indication to multiple UEs.

22. A user equipment (UE), comprising:
   a transceiver; and
   a frame-based equipment (FBE) communications module coupled to the transceiver, the FBE communications module configured to execute instructions to
      receive a channel occupancy time (COT) indicator in a first fixed frame period (FFP) from a base station (BS) in FBE mode,
      monitor a window of the first FFP,
      receive downlink control information (DCI) during the window, wherein to receive DCI during the window the UE executes instructions to receive the DCI in a group-common physical downlink control channel (GC-PDCCH), wherein the DCI is associated with a COT trigger indicator new radio network temporary identifier (CTI-RNTI), and
      transmit uplink (UL) data to the BS during a second FFP following the first FFP according to the DCI.

23. The UE of claim 22, wherein to transmit UL data the UE executes instructions to determine from a one-bit of the DCI whether transmission of the UL data can be performed by the UE at a beginning of the second FFP.

24. The UE of claim 22, wherein to transmit UL data the UE executes instructions to determine from two or more bits of the DCI whether transmission of the UL data can be performed by the UE during a number of following FFPs.

25. The UE of claim 22, wherein to transmit the UL data the UE executes instructions to determine from the DCI whether transmission of the UL data can be performed by a UE at a beginning of a subsequent FFP.

26. The UE of claim 25, wherein to determine from the DCI the UE executes instructions to monitor a one-bit field that is monitored by multiple UEs in a group.

27. The UE of claim 25 wherein to determine from the DCI the UE executes instructions to monitor a particular bit assigned to the UE from multiple bits that provide indication to multiple UEs.

28. The UE of claim 25, wherein to determine from the DCI the UE executes instructions to monitor a plurality of bits in the multiple bits directed to the UE that indicate which subsequent FFPs are available for UL transmission by the UE.

* * * * *